US010700723B2

(12) United States Patent
Hwang et al.

(10) Patent No.: US 10,700,723 B2
(45) Date of Patent: Jun. 30, 2020

(54) METHOD FOR TERMINAL, CONFIGURED TO AGGREGATE PLURALITY OF COMPONENT CARRIERS, FOR MITIGATING INTERFERENCE

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/327,772

(22) PCT Filed: Aug. 23, 2017

(86) PCT No.: PCT/KR2017/009204
§ 371 (c)(1),
(2) Date: Feb. 22, 2019

(87) PCT Pub. No.: WO2018/038527
PCT Pub. Date: Mar. 1, 2018

(65) Prior Publication Data
US 2019/0229759 A1 Jul. 25, 2019

Related U.S. Application Data

(60) Provisional application No. 62/378,228, filed on Aug. 23, 2016.

(51) Int. Cl.
*H04B 1/10* (2006.01)
*H04L 5/00* (2006.01)
(Continued)

(52) U.S. Cl.
CPC .............. *H04B 1/10* (2013.01); *H04L 5/00* (2013.01); *H04L 25/03* (2013.01); *H04W 88/02* (2013.01)

(58) Field of Classification Search
None
See application file for complete search history.

(56) References Cited

U.S. PATENT DOCUMENTS

2010/0322185 A1 12/2010 Park et al.
2012/0009935 A1* 1/2012 Wei ................. H04L 5/0073
455/450
(Continued)

FOREIGN PATENT DOCUMENTS

WO 2016021866 2/2016

OTHER PUBLICATIONS

PCT International Application No. PCT/KR2017/009204, International Search Report dated Nov. 23, 2017, 4 pages.

*Primary Examiner* — Lana N Le
(74) *Attorney, Agent, or Firm* — Lee Hong Degerman Kang Waimey

(57) ABSTRACT

One embodiment of the present specification provides a method for a terminal, configured to aggregate a plurality of component carriers, for mitigating interference. The method comprises the steps of: the terminal receiving control information from a base station, the control information comprising information indicating that interference mitigation action is to be carried out for a signal transmitted by means of a first component carrier from among the plurality of component carriers; on the basis of the interference environment, the terminal carrying out interference mitigation action by blind-detecting a cell-specific reference signal information for a second component carrier that is not the first component carrier; and the terminal transmitting, to the (Continued)

base station, information indicating that the interference mitigation action was carried out for the second component carrier.

6 Claims, 10 Drawing Sheets

(51) Int. Cl.
  *H04W 88/02* (2009.01)
  *H04L 25/03* (2006.01)

(56) References Cited

U.S. PATENT DOCUMENTS

| | | | |
|---|---|---|---|
| 2012/0122472 A1* | 5/2012 | Krishnamurthy | H04L 27/0012 455/456.1 |
| 2015/0131544 A1* | 5/2015 | Behravan | H04L 5/0048 370/329 |
| 2015/0195057 A1* | 7/2015 | Tan | H04J 11/005 370/252 |
| 2015/0222304 A1 | 8/2015 | Xu et al. | |
| 2015/0326290 A1* | 11/2015 | Harrison | H04B 7/0456 375/260 |
| 2015/0372778 A1* | 12/2015 | Xu | H04J 11/005 370/329 |
| 2015/0381388 A1* | 12/2015 | Zirwas | H04L 5/001 370/330 |
| 2016/0073366 A1* | 3/2016 | Ng | H04L 5/0048 370/329 |
| 2016/0095095 A1* | 3/2016 | Lorca Hernando | H04L 27/2613 370/329 |
| 2016/0219457 A1* | 7/2016 | Nammi | H04B 1/1036 |
| 2016/0286562 A1* | 9/2016 | Cui | H04W 28/0236 |
| 2017/0005744 A1* | 1/2017 | Li | H04J 11/0023 |
| 2017/0006501 A1* | 1/2017 | Sesia | H04J 11/005 |
| 2020/0022160 A1* | 1/2020 | Zou | H04W 72/1242 |

* cited by examiner

FIG. 7
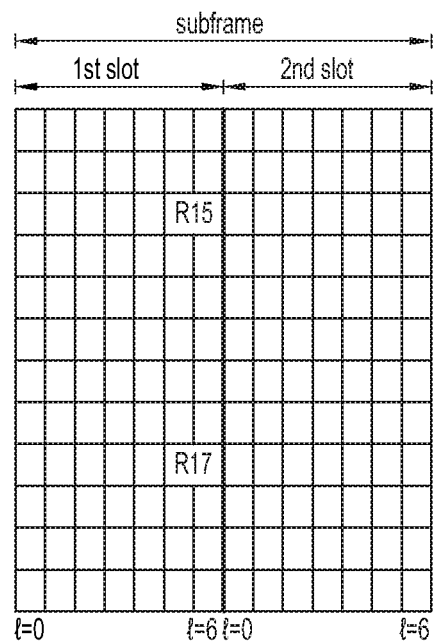
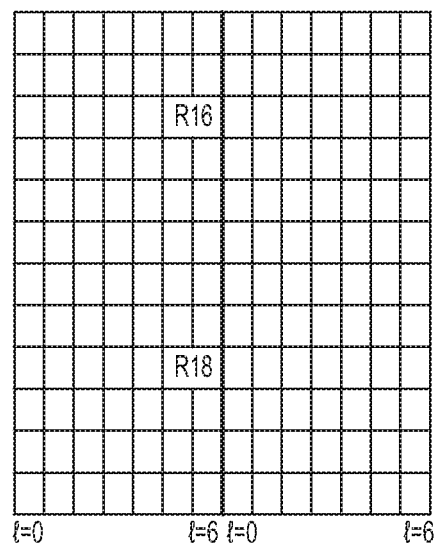
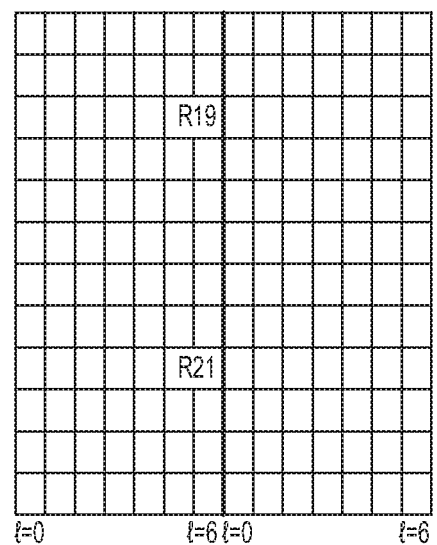
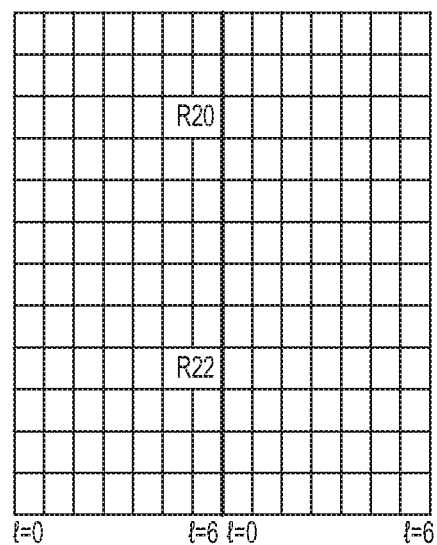

METHOD FOR TERMINAL, CONFIGURED TO AGGREGATE PLURALITY OF COMPONENT CARRIERS, FOR MITIGATING INTERFERENCE

CROSS-REFERENCE TO RELATED APPLICATIONS

This application is the National Stage filing under 35 U.S.C. 371 of International Application No. PCT/KR2017/009204, filed on Aug. 23, 2017, which claims the benefit of U.S. Provisional Application No. 62/378,228, filed on Aug. 23, 2016, the contents of which are all hereby incorporated by reference herein in their entireties.

BACKGROUND OF THE INVENTION

Field of the Invention

The present invention relates to wireless communication and, more particularly, to a method for a terminal to perform interference mitigation for a component carrier other than a component carrier indicated by a base station for interference mitigation.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE uses multiple input multiple output (MIMO) with up to four antennas. Recently, 3GPP LTE-A (LTE-Advanced), an evolution of 3GPP LTE, is under discussion.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

With increasing demands for social networking services (SNSs) from users, communication between physically adjacent user equipments (UEs), that is, device-to-device (D2D) communication, is required.

D2D communication may be performed between UEs located within the coverage of a base station or between UEs located outside the coverage of the base station. Further, D2D communication may be performed between a UE located outside the coverage of the base station and a UE located within the coverage of the base station.

The above-mentioned details about D2D communication may also be applied to vehicle-to-everything (V2X) communication. V2X collectively refers to a communication technology between a vehicle and any interface. V2X may be implemented in various forms, for example, vehicle-to-vehicle (V2V), vehicle-to-infrastructure (V2I), vehicle-to-person (V2P), vehicle-to-network (V2N), and the like.

When a UE is configured to aggregate a plurality of component carriers, if a component carrier for which the UE performs control channel interference mitigation (CCIM) is different from a component carrier indicated by a base station to perform CCIM, physical downlink control channel (PDCCH) control channel element (CCE) aggregation level (AL) scheduling for a control channel may not be agreed between the base station and the UE, which may reduce the overall reception performance of the UE.

SUMMARY OF THE INVENTION

Accordingly, the disclosure of the present specification aims to solve the above-mentioned problems.

In an aspect, provided is a method of performing interference mitigation by a user equipment (UE) configured to aggregate a plurality of component carriers. The method comprises receiving, by the UE, control information from a base station, the control information including information indicating that interference mitigation is to be performed for a signal transmitted via a first component carrier among the plurality of component carriers; performing, by the UE, interference mitigation for a second component carrier other than the first component carrier based on an interference environment; and transmitting, by the UE, information indicating that the interference mitigation has been performed for the second component carrier to the base station.

The interference mitigation is performed for the second component carrier when the UE is capable of performing blind detection of cell-specific reference signal information about the second component carrier.

The UE transmits the information indicating that the interference mitigation has been performed for the second component carrier to the base station through a physical uplink control channel (PUCCH), and transmits the information indicating that the interference mitigation has been performed for the second component carrier is comprised in a channel quality indication (CQI) index and a cell-specific reference signal-interference cancellation (CRS-IC) index of the second component carrier.

The interference environment comprises a strength of an interference signal.

The interference mitigation comprises CRS-IC and control channel interference mitigation (CCIM).

When a number of component carriers for which the UE can perform interference mitigation is greater than a number of component carriers indicated by the base station for interference mitigation, the UE performs interference mitigation for the first component carrier and additionally performs the interference mitigation for the second component carrier.

In another aspect, provided is a user equipment (UE) configured to aggregate a plurality of component carriers. The UE may comprise a radio frequency (RF) unit to receive control information from a base station; and a processor to control the RF unit, wherein the control information includes information indicating that interference mitigation is to be performed for a signal transmitted via a first component carrier among the plurality of component carriers, and the processor performs interference mitigation for a second component carrier other than the first component carrier based on an interference environment; and transmits information indicating that the interference mitigation has been performed for the second component carrier to the base station.

According to one disclosure of the present specification, when a UE performs interference mitigation for a component carrier that is different from a component carrier indicated by a base station for interference mitigation, the UE may notify the base station of this information, thereby preventing deterioration in the reception performance of the UE.

BRIEF DESCRIPTION OF THE DRAWINGS

FIG. 7 illustrates an example of an RB to which a CSI-RS is mapped among reference signals.

DESCRIPTION OF EXEMPLARY EMBODIMENTS

Figure 1:
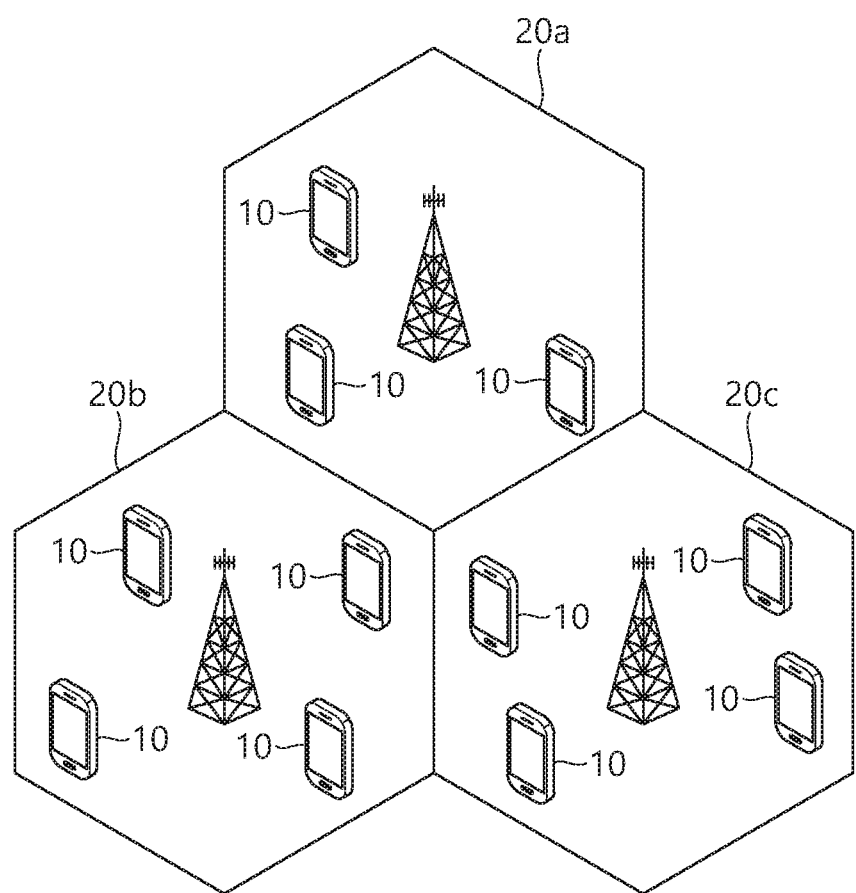
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belongs is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to as a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Hereinafter, the LTE system will be described in detail.

Figure 2:
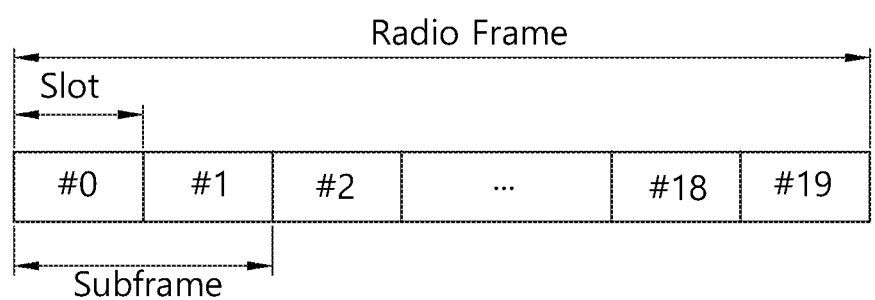
FIG. 2 illustrates the architecture of a radio frame according to frequency division duplex (FDD) of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
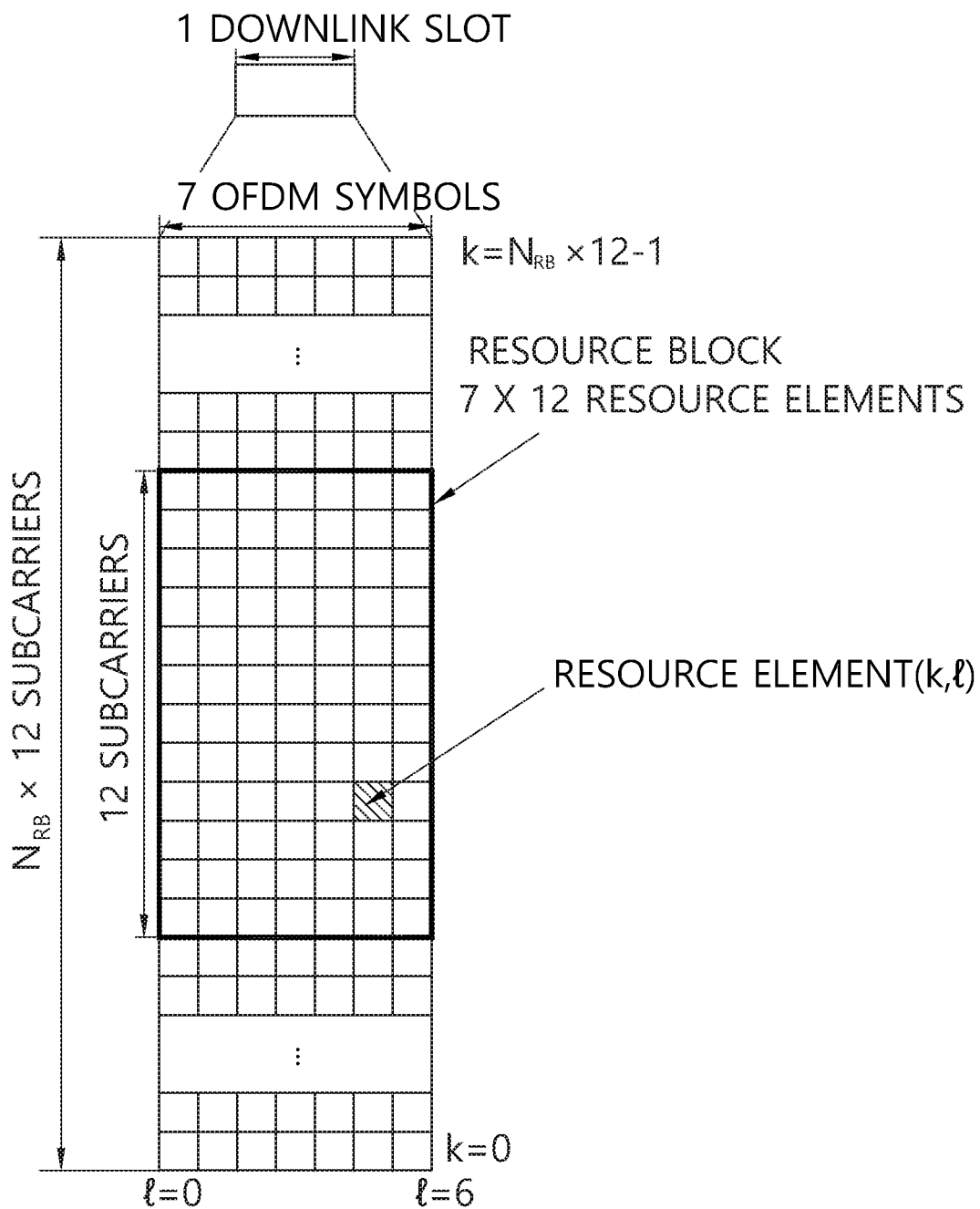
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

Figure 4:
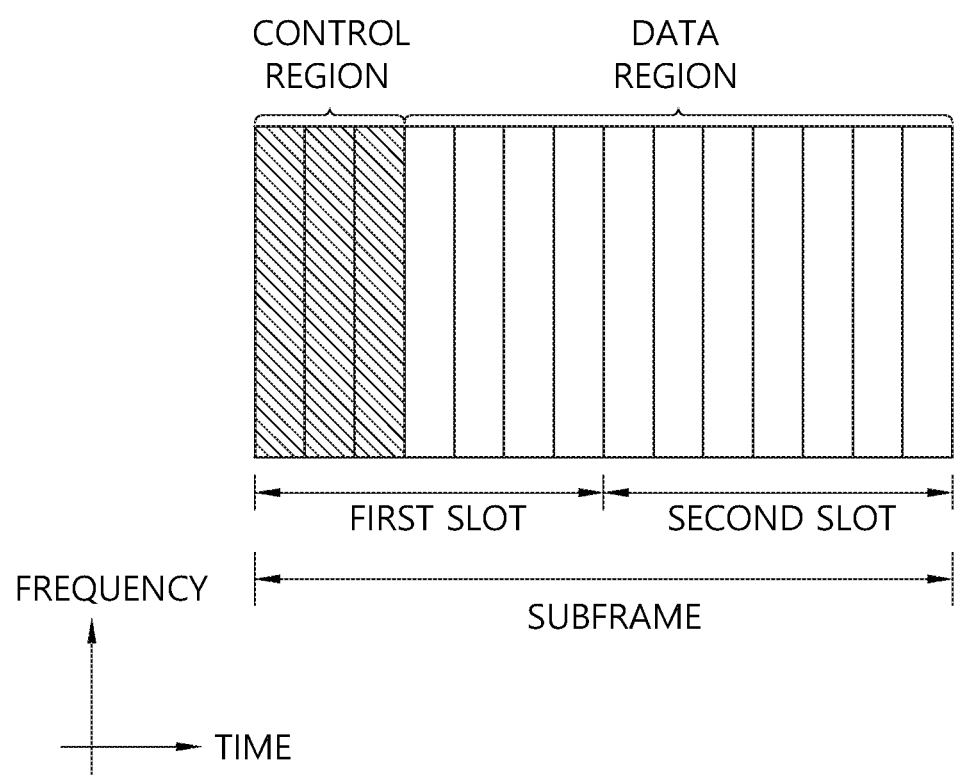
FIG. 4 illustrates the architecture of a downlink subframe.

In 3GPP LTE, the resource grid for one uplink slot shown in FIG. 4 may also apply to the resource grid for the downlink slot.

FIG. 4 illustrates the architecture of a downlink sub-frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 5:
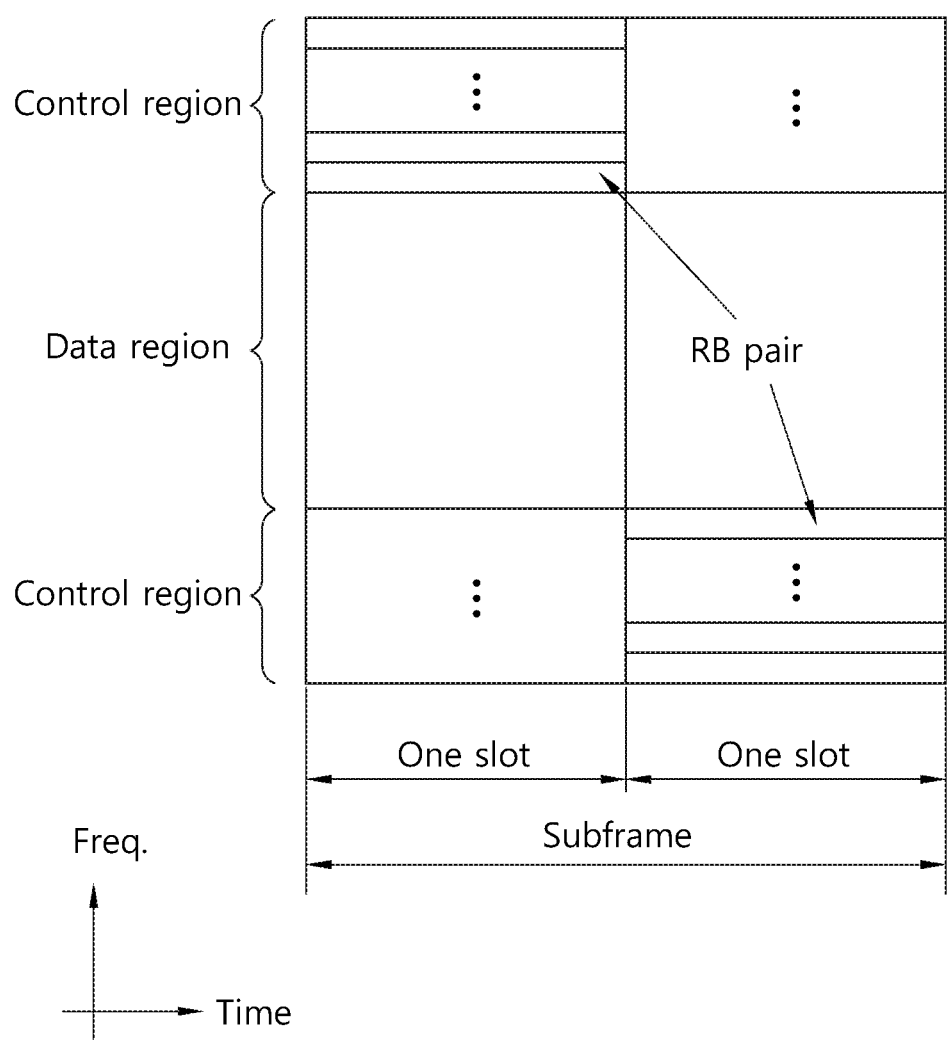
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

Hereinafter, a carrier aggregation system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

The carrier aggregation system may be divided into a continuous carrier aggregation system in which aggregated carriers are contiguous and a non-contiguous carrier aggregation system in which the aggregated carriers are separated from each other. Hereinafter, when the contiguous and non-contiguous carrier systems are just called the carrier aggregation system, it should be construed that the carrier aggregation system includes both a case in which the component carriers are contiguous and a case in which the component carriers are non-contiguous. The number of component carriers aggregated between the downlink and the uplink may be differently set. A case in which the number of downlink CCs and the number of uplink CCs are the same as each other is referred to as symmetric aggregation and a case in which the number of downlink CCs and the number of uplink CCs are different from each other is referred to as asymmetric aggregation.

When one or more component carriers are aggregated, the component carriers to be aggregated may just use a bandwidth in the existing system for backward compatibility with the existing system. For example, in a 3GPP LTE system, bandwidths of 1.4 MHz, 3 MHz, 5 MHz, 10 MHz, 15 MHz, and 20 MHz are supported and in a 3GPP LTE-A system, a wideband of 20 MHz or more may be configured by using only the bandwidths of the 3GPP LTE system. Alternatively, the wideband may be configured by not using the bandwidth of the existing system but defining a new bandwidth.

As described above, unlike a single carrier system, the carrier aggregation system can support a plurality of component carriers (CCs), that is, a plurality of serving cells.

Cells may be divided into a primary cell, a secondary cell, and a serving cell.

The primary cell refers to a cell that operates at a primary frequency and refers to a cell in which a UE performs an initial connection establishment procedure or a connection reestablishment procedure with a base station or a cell indicated as a primary cell during a handover procedure.

The secondary cell refers to a cell that operates at a secondary frequency, and is configured, once an RRC connection is established, and is used to provide an additional radio resource.

The serving cell is configured using a primary cell when carrier aggregation is not configured or a UE cannot provide carrier aggregation. When carrier aggregation is configured, the term "serving cell" indicates a cell configured for a UE, which may include a plurality of serving cells. One serving cell may include one downlink component carrier or a pair of a downlink component carrier and an uplink component carrier. A plurality of serving cells may include a set of a primary cell and one or a plurality of all secondary cells.

Figure 6:
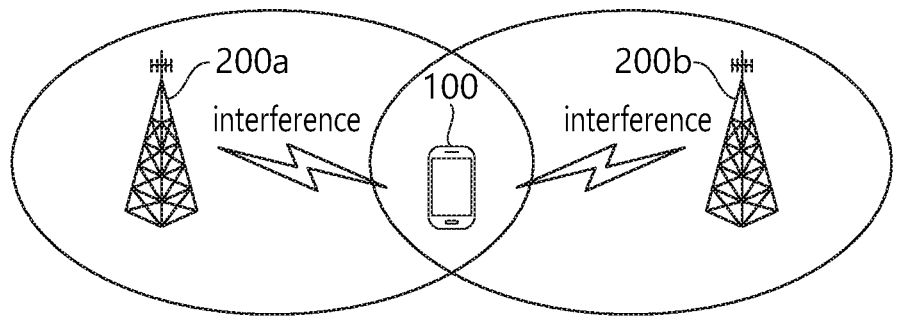
FIG. 6 illustrates inter-cell interference.

FIG. 6 illustrates inter-cell interference.

As illustrated in FIG. 6, when a UE 100 is located in an overlapping area of the coverage of a first cell 200a and the coverage of a second cell 200b, a signal of the first cell 200a acts as an interference with a second signal of the second cell 200b, while a signal of the second cell 200b acts as interference with a signal of the first cell 200a.

A basic method for addressing such an interference problem is using different frequencies for cells. However, since a frequency is a scarce and expensive resource, wireless service providers do not prefer a frequency division method.

Thus, the 3GPP employs a time division method to resolve the inter-cell interference problem.

Accordingly, the 3GPP has actively conducted studies on enhanced inter-cell interference coordination (eICIC) as an interference coordination method in recent years.

A time division method introduced in LTE-Release 10 has evolved as compared with a conventional frequency division method and thus is referred to as an enhanced ICIC. According to the time division method, an aggressor cell, which is a cell causing interference, suspends data transmission in a particular subframe so that a UE maintains connection to a victim cell, which is a cell undergoing the interference, in the subframe. That is, in the time division method, when different types of cells coexist, one cell temporarily suspends transmitting a signal to a UE having considerably high interference, thereby hardly sending an interference signal.

Meanwhile, the particular subframe in which data transmission is suspended is referred to as an almost blank subframe (ABS), in which no data is transmitted except for essential control data. The essential control data is, for example, a cell-specific reference signal (CRS). Therefore, not data but only CRSs are transmitted on OFDM symbols 0, 4, 7, and 11 in an ABS.

FIG. 7 illustrates an example of an RB to which a CSI-RS is mapped among reference signals.

A CSI-RS is used for channel measurement for generation of channel information and channel estimation on a PDSCH of an LTE-A UE. CSI-RSs are relatively sparsely arranged in the frequency region or time region, and may be punctured in the data region of a normal sub-frame or MBSFN sub-frame. When necessary through CSI estimation, CQI, PMI, and RI may be reported from the UE.

CSI-RSs are transmitted through one, two, four, or eight antenna ports. The antenna ports used here are p=15, p=15, 16, p=15, . . . , 18 and p=15, . . . , 22, respectively. That is, CSI-RSs may be transmitted through one, two, four, and eight antenna ports. See 3GPP (3rd Generation Partnership Project) TS 36.211 V10.1.0 (2011 March) "Technical Specification Group Radio Access Network; Evolved Universal Terrestrial Radio Access (E-UTRA); Physical channels and modulation (Release 8)," Ch. 6.10.5 for the CSI-RS.

In transmission of a CSI-RS, up to 32 different configurations may be proposed to reduce inter-cell interference (ICI) in a multi-cell environment including a heterogeneous network (HetNet) environment. The configuration of the CSI-RS may be varied depending on the number of antenna ports in the cell and CP, and a neighboring cell may have a configuration as different as possible. Further, CSI-RS configurations may be divided depending on the frame structure into ones applied to both the FDD frame and TDD frame and ones applied only to the TDD frame. A plurality of CSI-RS configurations in one cell may be used. Zero or one CSI-RS configuration for UEs assuming non-zero power CSI-RSs and 0 or several CSI-RS configurations for UEs assuming zero power CSI-RSs may come in use.

The CSI-RS configurations may be indicated by a higher layer. For example, a CSI-RS-Config IE (information element) transmitted through a higher layer may indicate a CSI-RS configuration. Table 1 shows an example of CSI-RS-Config IE.

TABLE 1

```
CSI-RS-Config-r10 ::= SEQUENCE {
csi-RS-r10                          CHOICE {
release                             NULL,
setup                               SEQUENCE {
antennaPortsCount-r10                 ENUMERATED {an1, an2, an4,
                                      an8},
resourceConfig-r10                    INTEGER (0..31),
subframeConfig-r10                    INTEGER (0..154),
p-C-r10                               INTEGER (-8..15)
}
}                                   OPTIONAL,     -- Need ON
zeroTxPowerCSI-RS-r10               CHOICE {
release                             NULL,
setup                               SEQUENCE {
zeroTxPowerResourceConfigList-r10     BIT STRING (SIZE (16)),
zeroTxPowerSubframeConfig-r10         INTEGER (0..154)
}
}                                   OPTIONAL      -- Need ON
}
-- ASN1STOP
```

Referring to Table 1, the 'antennaPortsCount' field indicates the number of antenna ports used for transmission of a CSI-RS. The 'resourceConfig' field indicates a CSI-RS configuration. The 'SubframeConfig' field and 'zeroTxPowerSubframeConfig' field indicate sub-frame configurations where a CSI-RS is transmitted.

The 'zeroTxPowerResourceConfigList' field indicates a zero-power CSI-RS configuration. The CSI-RS configurations corresponding to bits set to 1's in the bitmap of 16 bits constituting the 'zeroTxPowerResourceConfigList' field may be set as zero-power CSI-RSs.

A sequence rl,ns(m) for CSI-RS may be generated as in the following equation.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, \ldots, N_{RB}^{max,DL} - 1$$

where, $$c_{init} = 2^{10} \cdot (7 \cdot (n_s + 1) + l + 1) \cdot (2 \cdot N_{ID}^{cell} + 1) + 2 \cdot N_{ID}^{cell} + N_{CP}$$

$$N_{CP} = \begin{cases} 1 & \text{for normal } CP \\ 0 & \text{for extended } CP \end{cases}$$

In Equation 1, ns is a slot number in the radio frame, and l is an OFDM symbol number in the slot. c(i) is a pseudo random sequence and is started at each OFDM symbol with cinit indicated in Equation 1. NIDcell means a physical cell ID.

In sub-frames configured to transmit CSI-RSs, the reference signal sequence rl,ns(m) is mapped to a complex value modulation symbol ak,l(p) used as a reference symbol for antenna port p.

The relationship between rl,ns(m) and ak,l(p) is given as in the following equation.

$$a_{k,l}^{(p)} = w_{l''} \cdot r(m)$$ [Equation 2]

where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & CSI \text{ reference signal configurations } 0\text{-}19, \text{ normal cyclic prefix} \\ 2l'' & CSI \text{ reference signal configurations } 20\text{-}31, \text{ normal cyclic prefix} \\ l'' & CSI \text{ reference signal configurations } 0\text{-}27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In the Equation, (k', l') and ns are given in Tables 2 and 3 described below. A CSI-RS may be transmitted in a downlink slot where (ns mod 2) meets the conditions in Tables 2 and 3 to be described below (where, 'mod' means modular computation. That is, (ns mod 2) means the remainder obtained by dividing ns by 2).

Table 5 represents a CSI-RS configuration in normal CP, and Table 3 represents a CSI-RS configuration in extended CP.

TABLE 2

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| TDD frame | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI-RS configuration index | Number of configured CSI-RSs | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| TDD and FDD frames | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| TDD frame | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |

TABLE 3-continued

| CSI-RS configuration index | Number of configured CSI-RSs | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 24 | (6, 1) | 1 | | | | |
| 25 | (2, 1) | 1 | | | | |
| 26 | (1, 1) | 1 | | | | |
| 27 | (0, 1) | 1 | | | | |

The UE may transmit CSI-RSs only in the downlink slot meeting the condition of ns mod 2 in Tables 5 and 6. Further, the UE abstains from transmitting CSI-RSs in a special sub-frame of a TDD frame, a sub-frame where CSI-RS transmission collides with a synchronization signal, PBCH (physical broadcast channel), and system information block type 1 (SystemInformationBlockType1) or a sub-frame where a paging message is transmitted. Further, in a set S, where S={15}, S={15, 16}, S={17, 18}, S={19, 20} or S={21, 22}, a resource element where a CSI-RS of one antenna port is transmitted is not used for transmission of a CSI-RS of another antenna port.

Below table shows an example of a configuration of a sub-frame where a CSI-RS is transmitted.

TABLE 4

| CSI-RS-SubframeConfig $I_{CSI-RS}$ | CSI-RS period $T_{CSI-RS}$ (sub-frame) | CSI-RS sub-frame offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to above table, depending on the CSI-RS sub-frame configuration (ICSI-RS), the period (TCSI-RS) of the sub-frame where CSI-RSs are transmitted and an offset (ΔCSI-RS) may be determined. The CSI-RS sub-frame configuration in Table 4 may be one of the 'SubframeConfig' field or 'ZeroTxPowerSubframeConfig' field of the CSI-RS-Config IE in Table 1. The CSI-RS sub-frame configuration may be separately made for non-zero power CSI-RSs and zero power CSI-RSs.

Meanwhile, FIG. 7 illustrates resource elements used for CSI-RSs when the CSI-RS configuration index is 0 in normal CP. Rp denotes a resource element used for CSI-RS transmission on antenna port p. Referring to FIG. 7, CSI-RSs for antenna ports 15 and 16 are transmitted through the resource elements corresponding to the third subcarriers (subcarrier index 2) of the sixth and seventh OFDM symbols (OFDM symbol indexes 5 and 6) of the first slot. The CSI-RSs for antenna ports 17 and 18 are transmitted through resource elements corresponding to the ninth subcarriers (subcarrier index 8) of the sixth and seventh OFDM symbols (OFDM symbol indexes 5 and 6) of the first slot. The CSI-RSs for antenna ports 19 and 20 are transmitted through the same resource element where the CSI-RSs for antenna ports 15 and 16 are transmitted, and the CSI-RSs for antenna ports 21 and 22 are transmitted through the same resource element where the CSI-RSs for antenna ports 17 and 18 are transmitted.

When CSI-RSs are transmitted to the UE through eight antenna ports, the UE will receive RBs to which R15 to R22 are mapped. That is, the UE will receive a CSI-RS having a particular pattern.

<Channel State Information-Interference Measurement (CSI-IM)>

As described above, since the quality of a channel between a UE and a cell depends on interference, it may be important that the cell allows the UE to perform interference measurement (IM) and to transmit an interference measurement report (IMR) in order to identify accurate CSI.

In a dense network environment, that is, in an environment in which a plurality of small cells is concentrated, interference in a data channel arising from an adjacent cell may increases, and thus the reception performance of a UE may be reduced overall. Accordingly, extensive studies have been conducted on a receiver that is capable of eliminating interference in a data channel.

The UE may receive interference not only in the data channel but also in a control channel from the adjacent cell. If the interference is significant, the signal-to-interference-plus-noise ratio (SINR) of the control channel is reduced, which may affect the reception performance of the UE. Therefore, a receiver capable of eliminating interference not only in a data channel but also in a control channel is also needed.

The interference by the adjacent cell that may affect the reception performance of the UE may also arise the same even when the UE is configured to aggregate a plurality of component carriers (CCs). Here, if the UE performs interference mitigation for a CC that is different from a CC indicated by a base station to perform interference mitigation for, the base station does not have information on the different CC for which interference mitigation is performed, thus causing a disagreement over PDCCH control channel element (CCE) aggregation level (AL) scheduling between the base station and the UE.

<Disclosure of the Present Specification>

Therefore, in order to solve the foregoing problem, a disclosure of the present specification proposes a method of reporting information on a CC for which interference mitigation is performed to a base station when the UE performs interference mitigation for a CC different from a CC indicated by the base station to perform interference mitigation for.

When the UE supports carrier aggregation (CA), the UE may perform control channel interference mitigation (CCIM) for each CC. For CCIM, the UE may use a minimum mean square error (MMSE)-interference rejection combining (IRC) (hereinafter, "IRC") receiver and/or an enhanced MMSE-IRC (E-LMMSE-IRC) (hereinafter, "EIRC") receiver, and CRS-interference cancellation (CRS-IC) may be performed for smooth IRC and EIRC operations.

In the present specification, interference mitigation operation may refer to CCIM and/or CRS-IC but is not limited thereto. That is, in the present specification, interference mitigation may refer to any operation of mitigating (or eliminating) interference arising from other cells in order for a UE to properly receive signals.

According to an embodiment, the base station may transmit information about an adjacent cell to the UE through RRC signaling, and the UE may perform CRS IC using the information about the adjacent cell. The information about the adjacent cell may be CRS-AssistanceInfo. When the UE supports carrier aggregation, the base station may transmit information about all aggregated CCs to the UE or may transmit information about only some CCs among all aggregated CCs to the UE.

The base station may transmit, to the UE, information about a CC determined on the basis of reference signal received power (RSRP) reported from the UE. That is, the base station may instruct the UE to perform interference mitigation for the CC determined on the basis of the RSRP.

However, despite having the information received from the base station, the UE may perform interference mitigation for a CC determined on the basis of the strength of an interference signal caused from the adjacent cell. That is, when it is determined that there is no effect even though the UE performs interference mitigation operation according to the strength of the interference signal, the UE may perform interference mitigation for another CC despite having the information generated on the basis of the RSRP.

According to another embodiment, the UE may not be able to perform interference mitigation for all the aggregated CCs. In addition, the UE may not perform interference mitigation for all of the CCs indicated by the base station for interference mitigation. Here, the UE may independently determine a CC to perform interference mitigation for according to the interference environment around the UE regardless of the information received from the base station and may perform interference mitigation for the determined CC.

Here, the base station does not know which CC the UE performs interference mitigation for, thus causing a disagreement over PDCH control channel element (CCE) aggregation level (AL) scheduling between the BS and the UE.

For example, when the UE is configured to aggregate three CCs and can perform interference mitigation for only one CC, the base station instructs the UE to perform interference mitigation for a first CC among the three CCs, in which the base station expects the UE to perform interference mitigation operation for the first CC time and thus may reduce and transmit the PDCCH CCE AL of the first CC. However, as described in the above embodiments, the UE may perform interference mitigation for a second CC other than the first CC considering the interference environment (e.g., interference strength) of each CC. Here, the UE may report to the base station that the UE performs interference mitigation for the second CC in order to prevent a disagreement in PDCCH CCE AL scheduling.

That is, the UE may operate as follows to prevent a disagreement over PDCCH CCE AL scheduling with the base station.

According to embodiments, it may be assumed that the UE can perform interference mitigation only for a CC indicated by the base station for interference mitigation. In this case, when the number (e.g., K) of CCs for which the UE can perform interference mitigation is equal to the number (e.g., M) of CCs indicated by the base station (e.g., M=K), the UE may perform interference mitigation for a CC indicated by the base station for interference mitigation.

However, when the number (e.g., K) of CCs for which the UE can perform interference mitigation is greater than the number (e.g., M) of CCs indicated by the base station (e.g., K>M), if the UE can perform blind detection of cell-specific reference signal (CRS) information for a CC that is different from a CC indicated by the base station for interference mitigation, the UE may perform interference mitigation for the CC indicated by the base station for interference mitigation and may additionally perform interference mitigation for the different CC on the basis of the interference environment. Here, the UE may report to the base station that interference mitigation is additionally performed for the different CC.

In the present specification, the CRS information may refer to information about CRS-AssistanceInfo received from the base station. The CRS-AssistanceInfo may include information about a cell ID, the number of antenna ports, and an MBSFN configuration. Accordingly, the UE performing blind detection of CRS information about an adjacent cell may mean that the UE performs blind detection of the information about the cell ID, the number of antenna ports, and the MBSFN configuration included in CRS-AssistanceInfo about the adjacent cell.

The UE may transmit, to the base station, information indicating that interference cancellation has been additionally performed for the different CC. According to embodiments, the information may be configured to be one bit but is not limited thereto. That is, the information may be an N-bit (N is a natural number of 2 or more) signal or a newly defined signal instead of a form added to CSI.

Figure 8:
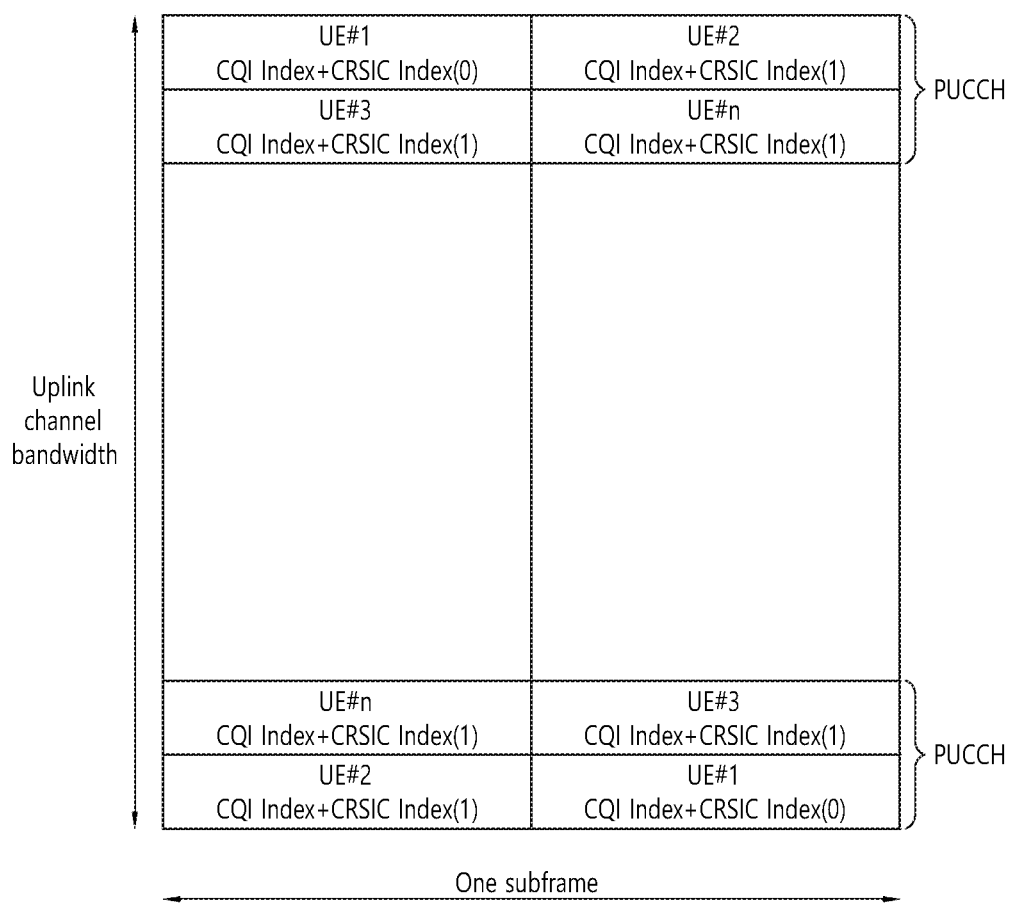
FIG. 8 illustrates an example of a case where a terminal transmits a 1-bit signal to report whether an interference mitigation operation is performed to a base station.

Referring to FIG. 8, according to embodiments, the information may be transmitted to the base station through a PUCCH with the CQI index and the CRS-IC index of each CC. When there is a plurality of UE transmitting the information, the information may be transmitted separately by each UE. Referring to FIG. 8, when the UE does not perform interference mitigation for the different CC, the CRS-IC index may be indicated as CRS-IC index(0). When the UE performs interference mitigation for the different CC, the CRS-IC Index may be indicated as CRS-IC index(1).

According to other embodiments, it may be assumed that the UE can perform interference mitigation operation considering the interference environment of the aggregated CCs regardless of the information about interference mitigation transmitted by the base station and can perform blind detection of CRS information about each CC. In this case, when the UE performs interference mitigation for a CC other than a CC indicated by the base station for interference mitigation, the UE may transmit information about the CC for which interference mitigation is performed to the base station. The information may be configured to be one bit but is not limited thereto. That is, the information may be an N-bit (N is a natural number of 2 or more) signal or a newly defined signal instead of a form added to CSI.

Figure 9:
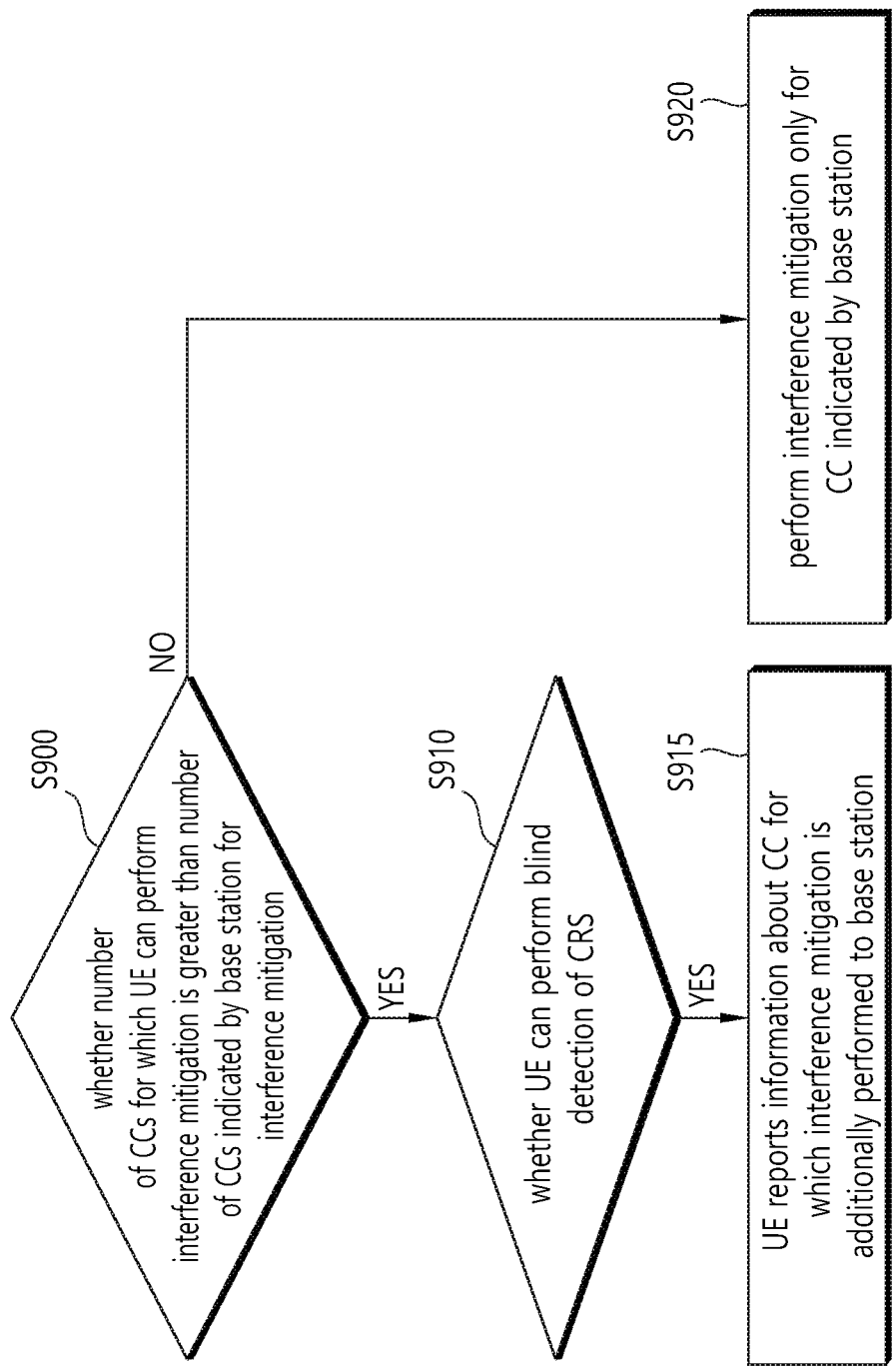
FIG. 9 is a flowchart illustrating a case where a UE reports whether to perform interference mitigation to a base station according to a disclosure of the present specification.

FIG. 9 is a flowchart illustrating a case where a UE reports whether to perform interference mitigation to a base station according to a disclosure of the present specification.

The base station may transmit information about interference mitigation to be performed by the UE to the UE. The information on the interference mitigation may include information about a CC for which the interference mitigation is performed. That is, the UE may determine a CC to perform interference mitigation for using the information on the interference mitigation. The UE may perform interference mitigation for the CC indicated by the base station for the interference mitigation for according to the information on the interference mitigation.

The UE may compare the number of CCs indicated by the base station for interference mitigation with the number of CCs for which the UE can perform interference mitigation. When the number of CCs for which the UE can perform interference mitigation is greater than the number of CCs indicated by the base station for interference mitigation (YES in S900), if the UE can perform blind detection of information about a CRS of an adjacent cell (YES in S910), the UE may additionally perform interference mitigation for a CC other than the CC indicated by the base station for interference mitigation.

Here, the UE may report information about the CC for which interference mitigation is additionally performed to the base station (S915). According to embodiments, the information about the CC for interference mitigation is additionally performed may be indicated using a one-bit signal. That is, the UE may transmit the information to the base station by adding one bit indicating that interference mitigation is additionally performed to CSI about the CC for interference mitigation is additionally performed but is not limited thereto. That is, the information about the CC for interference mitigation is additionally performed may be an N-bit (N is a natural number of 2 or more) signal or a newly defined signal instead of a form added to the CSI When the number of CCs for which the UE can perform interference mitigation is not greater than the number of CCs indicated by the base station for interference mitigation (NO in S900), that is, when the number of CCs for which the UE can perform interference mitigation is equal to the number of CCs indicated by the base station for interference mitigation, the UE may perform interference mitigation for the CC indicated by the base station for interference mitigation (S920).

The foregoing details may be implemented by hardware.

Figure 10:
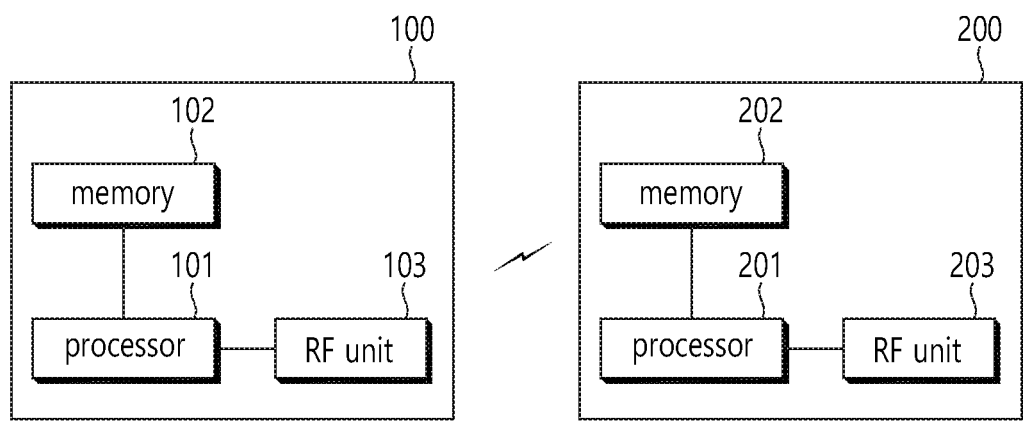
FIG. 10 is a block diagram illustrating a wireless communication system according to disclosure of this specification.

FIG. 10 is a block diagram illustrating a wireless communication system according to disclosure of this specification.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/or receive a wireless signal. The processor 201 implements a suggested function, process, and/or method. In the foregoing exemplary embodiment, operation of the base station may be implemented by the processor 201.

An UE 100 includes a processor 101, a memory 102, and an RF unit 103. The memory 102 is connected to the processor 101 to store various information for driving the processor 101. The RF unit 103 is connected to the processor 101 to transmit and/or receive a wireless signal. The processor 101 implements a suggested function, process, and/or method.

The processor may include an application-specific integrated circuit (ASIC), another chipset, a logic circuit and/or a data processor. The memory may include a read-only memory (ROM), a random access memory (RAM), a flash memory, a memory card, a storage medium, and/or another storage device. The RF unit may include a baseband circuit for processing a wireless signal. When an exemplary embodiment is implemented with software, the above-described technique may be implemented with a module (process, function) that performs the above-described function. The module may be stored at a memory and may be executed by the processor. The memory may exist at the inside or the outside of the processor and may be connected to the processor with well-known various means.

In the above illustrated systems, although the methods have been described on the basis of the flowcharts using a series of steps or blocks, the present invention is not limited to the sequence of the steps, and some of the steps may be performed with different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing interference mitigation by a user equipment (UE) configured to aggregate a plurality of component carriers, the method comprising:
   receiving, by the UE, control information from a base station, the control information including information indicating that interference mitigation is to be performed for a signal transmitted via a first component carrier among the plurality of component carriers;
   performing, by the UE, interference mitigation for a second component carrier other than the first component carrier based on an interference environment, based on that the UE is capable of performing blind detection of cell-specific reference signal from an adjacent cell in the second component carrier; and
   transmitting, by the UE, information that the interference mitigation has been performed for the second component carrier to the base station, through a physical uplink control channel (PUCCH) signal,
   wherein the PUCCH signal includes a channel quality indication (CQI) index and a cell-specific reference signal-interference cancellation (CRS-IC) index, and
   wherein at least one of the CQI index and the CRS-IC index includes the information that the interference mitigation has been performed for the second component carrier.

2. The method of claim 1, wherein the interference environment comprises a strength of an interference signal.

3. The method of claim 2, wherein the interference mitigation comprises CRS-IC and control channel interference mitigation (CCIM).

4. The method of claim 1, wherein when a number of component carriers for which the UE can perform interference mitigation is greater than a number of component carriers indicated by the base station for interference mitigation, the UE performs interference mitigation for the first component carrier and additionally perform the interference mitigation for the second component carrier.

5. A user equipment (UE) configured to aggregate a plurality of component carriers, the UE comprising:
   a transceiver to receive control information from a base station; and
   a processor to control the transceiver,
   wherein the control information includes information indicating that interference mitigation is to be performed for a signal transmitted via a first component carrier among the plurality of component carriers, and
   wherein the processor:
      performs interference mitigation for a second component carrier other than the first component carrier based on an interference environment, based on that the UE is capable of performing blind detection of cell-specific reference signal from an adjacent cell in the second component carrier; and
      transmits information that the interference mitigation has been performed for the second component carrier to the base station through a physical uplink control channel (PUCCH) signal, wherein the PUCCH signal includes a channel quality indication (CQI) index and a cell-specific reference signal-interference cancellation (CRS-IC) index, wherein at least one of the CQI index and the CRS-IC index includes the information that the interference mitigation has been performed for the second component carrier.

6. The UE of claim 5, wherein the interference environment comprises a strength of an interference signal.

* * * * *